US011974957B2

(12) United States Patent
Colon et al.

(10) Patent No.: US 11,974,957 B2
(45) Date of Patent: May 7, 2024

(54) WALKER STEP

(71) Applicant: C & R Health Care Innovations LLC, Ocala, FL (US)

(72) Inventors: Pedro Colon, Ocala, FL (US); Aurelio Reyes, Mount Dora, FL (US)

( * ) Notice: Subject to any disclaimer, the term of this patent is extended or adjusted under 35 U.S.C. 154(b) by 375 days.

(21) Appl. No.: 17/346,001

(22) Filed: Jun. 11, 2021

(65) Prior Publication Data

US 2021/0386612 A1 Dec. 16, 2021

Related U.S. Application Data

(60) Provisional application No. 63/037,638, filed on Jun. 11, 2020.

(51) Int. Cl.
*A61H 3/00* (2006.01)
*A47C 12/00* (2006.01)

(52) U.S. Cl.
CPC ................ *A61H 3/00* (2013.01); *A47C 12/00* (2013.01); *A61H 2003/005* (2013.01); *A61H 2201/1642* (2013.01); *A61H 2201/1676* (2013.01)

(58) Field of Classification Search
CPC ................ A61H 3/00; A61H 2003/005; A61H 2201/1642; A61H 2201/1676; A61H 2201/164; A47C 12/00; A47C 16/02
USPC ................................................ 135/66, 67, 74
See application file for complete search history.

(56) References Cited

U.S. PATENT DOCUMENTS

| | | | | | |
|---|---|---|---|---|---|
| 2,866,495 | A * | 12/1958 | Diehl | A61G 5/08 | 297/42 |
| 3,516,425 | A * | 6/1970 | Rigal | A61H 3/00 | 248/157 |
| 4,452,484 | A * | 6/1984 | Pastor | A61H 3/00 | 297/150 |
| 4,722,356 | A * | 2/1988 | Rehder | A61H 3/00 | 297/423.37 |
| 4,907,839 | A * | 3/1990 | Rose | A61H 3/00 | 297/334 |
| 5,086,798 | A * | 2/1992 | Motts | A61H 3/00 | 297/5 |
| 5,291,909 | A * | 3/1994 | Skorman | A61H 3/00 | 135/69 |
| 5,704,682 | A * | 1/1998 | Gorayeb | A47C 9/10 | 297/440.11 |
| 5,882,067 | A * | 3/1999 | Carbajal | A61H 3/00 | 135/74 |
| 6,123,089 | A * | 9/2000 | Fish | A61H 3/00 | 297/5 |
| 6,145,524 | A * | 11/2000 | Li | A61H 3/00 | 135/69 |
| 6,302,126 | B1 * | 10/2001 | Nava | A61H 3/00 | 297/440.11 |
| 10,857,058 | B1 * | 12/2020 | Casibang | A61H 3/04 | |

(Continued)

FOREIGN PATENT DOCUMENTS

| | | | | |
|---|---|---|---|---|
| CN | 217938643 U | * 12/2022 | | |
| GB | 1443760 A | * 7/1976 | | A45B 7/00 |

*Primary Examiner* — Robert Canfield
(74) *Attorney, Agent, or Firm* — Eugenio J. Torres-Oyola; Victor M. Rodriguez-Reyes; Rafael Rodriguez-Muriel

(57) ABSTRACT

A walker that includes a first frame having first and second legs, a second frame having first and second legs, one or more support bars connecting the first leg of the first frame to the first leg of the second frame; and a foldable or stowable foot rest.

11 Claims, 5 Drawing Sheets

(56) References Cited

U.S. PATENT DOCUMENTS

| | | | | |
|---|---|---|---|---|
| 2005/0005959 | A1* | 1/2005 | Diamond | A61H 3/00 135/67 |
| 2005/0205122 | A1* | 9/2005 | Bly | A61H 3/04 135/85 |
| 2007/0199586 | A1* | 8/2007 | Cheng | A61H 3/04 280/87.021 |
| 2012/0048318 | A1* | 3/2012 | Zendzian | A61H 3/04 297/423.39 |
| 2017/0202727 | A1* | 7/2017 | Wegener | A61H 3/00 |
| 2021/0378405 | A1* | 12/2021 | Boyer | A47C 12/00 |
| 2022/0331190 | A1* | 10/2022 | Colon | A61H 3/00 |

* cited by examiner

WALKER STEP

FIELD OF THE DISCLOSURE

This disclosure relates to a walker step with a foldable or stowable foot rest.

BACKGROUND OF THE DISCLOSURE

Many areas of a house, such as bathrooms and other small rooms, do not have space that is adequate for allowing individuals (especially those with physical disabilities) to move or transfer from one point to another without difficulty, discouraging the individual from using assistive equipment or causing the individual to hold onto unsuitable surfaces, which can cause excessive forces or pressure to muscles and/or joints. Failure to use proper equipment or not performing good movement mechanics could cause musculoskeletal discomfort or injury, or joint or nervous system injuries. As a consequence, people should use assistive equipment to avoid the risk of falls.

Falls can occur at any time and to anyone, but over the years the risk is greater. Health complications from falls can range from just simple injuries to life-threatening injuries. In the United States, these accidents constitute the seventh leading cause of death in elderly people, and it is estimated that 50% of deaths are related to falls. Falls are the cause of more than 8 million emergency room (ER) visits each year, and the numbers outnumber any other type of injury or illness that requires a visit to a hospital emergency room. Half of accidental fall deaths occur in the home.

The Centers for Disease Control and Prevention (CDC) reports that 1 in 3 adults over the age of 65 suffer falls, leading from moderate to severe injuries. As a consequence, the most common injuries suffered are hip fractures and head trauma, which increases the risk of death. For older adults, falls are the leading cause of fatal and non-fatal injuries. The CDC reports that during a typical year, 2.4 million fatal falls require emergency room treatment, and of these, more than 722,000 patients were admitted for treatment at the facility. To prevent falls, much remains to be done. Education, counseling and the use of assistance teams are necessary tools to reduce these statistics.

With proper equipment or new assistive equipment, the probability of falls is dramatically reduced. Walkers are a helpful tool in avoiding or reducing falls. However, walkers alone may not be sufficient to help individuals with physical disabilities to reach certain places. Accordingly, it would be desirable to have a walker that provides an ideal elevation so that the individual using the walker can more easily access areas that are hard to reach with a standard walker, such as high off the ground beds, chairs or cars.

As discussed in more detail below, the invention relates a foldable or stowable step that attaches to the walker to provide better elevation of the lower extremities, assisting an individual with physical disabilities to reach hard to reach places.

SUMMARY OF THE DISCLOSURE

The disclosure relates to a walker, comprising a first frame; a second frame; wherein the first frame includes a first leg and a second leg; wherein the second frame includes a first leg and a second leg; one or more support bars connecting the first leg of the first frame to the first leg of the second frame; a first top bar connecting an upper end of the first leg of the first frame with an upper end of the second leg of the first frame; a second top bar connecting an upper end of the second leg of the second frame with an upper end of the second leg of the second frame; a foldable foot rest; wherein the foldable foot rest is pivotally connected to a rod having a first end fastened to the first leg of the first frame and a second end fastened to the second leg of the first frame; wherein the foldable foot rest comprises one or more retractable foot rest support legs at a bottom portion of the flat surface.

DETAILED DESCRIPTION OF THE DISCLOSURE

As shown in FIGS. 1-8, the disclosure relates to a walker A comprising a first frame 1, a second frame 2, wherein the first frame includes a first leg 12*a* and a second leg 12*b*; and the second frame 2 includes a first leg 13*a* and a second leg 13*b*. Moreover, the walker A comprises one or more support bars SB1, SB2 connecting the first leg 12*a* of the first frame 1 to the first leg 13*a* of the second frame 2. It should be noted that the first end of the support bars SB1, SB2 can be welded or fastened to the first leg 12*a* of the first frame and that the second end of the support bars SB1, SB2 can also welded or fastened to the first leg 13*a* of the second frame. Lastly, the walker A comprises a foldable or stowable foot rest or step FR pivotally connected to either of the frames 1, 2 via the one or more pivot joints PV1. Particularly, the foot rest FR is pivotally connected to a rod R having a first end connected, fastened, or welded to the first leg 12*a* of the first frame 1; and a second end connected, fastened or welded to the second leg 12*b* of the first frame 1. Accordingly, the foot rest FR can rotate at the juncture in which they are pivotally connected and achieve a horizontal position if the foot rest FR is lowered; or a vertical position of the foot rest FR is raised. Alternatively, the first end of the rod R can be connected, welded, or fastened to the first leg 13*a* and the other end can be connected, welded, or fastened to the second leg 13*b* of the second frame 2. The material of the walker A, including the foot rest FR, can be selected from any strong, durable material such a plastic, metal, or any other similar material. Moreover, while the foot rest should preferably have a rectangular shape, it can have any shape capable of serving as a foot rest.

The first frame 1 may optionally include one or more bars B1, B2 connecting each first frame leg 12*a*, 12*b*; and the second frame 2 may optionally include one or more bars B3, B4 connecting each second frame leg 13*a*, 13*b*, in order to provide more stability to the first and second frames 1, 2.

Moreover, as shown in FIGS. 1-8, the first frame 1 includes a first top bar TB1 connecting an upper end or portion of the first leg 12*a* of first frame with an upper end or portion of the second leg 12*b* of the first frame. Similarly, the second frame 2 includes a second top bar TB2 connecting an upper end or portion of the first leg 13*a* of the second frame with an upper end or portion of the second leg 13*b* of the second frame. The top bars TB1, TB2 allow a user to grab or hold on to the walker A while using the walker. It should be noted that the first leg 12*a* and second leg 12*b* of the first frame 1; as well as the first leg 13*a* and second leg 13*b* of the second frame 2, may extend obliquely and away from the center of the corresponding top bar. This configuration provides additional stability to the walker A, as shown in FIGS. 1, 2, 4 and 6.

Figure 1:
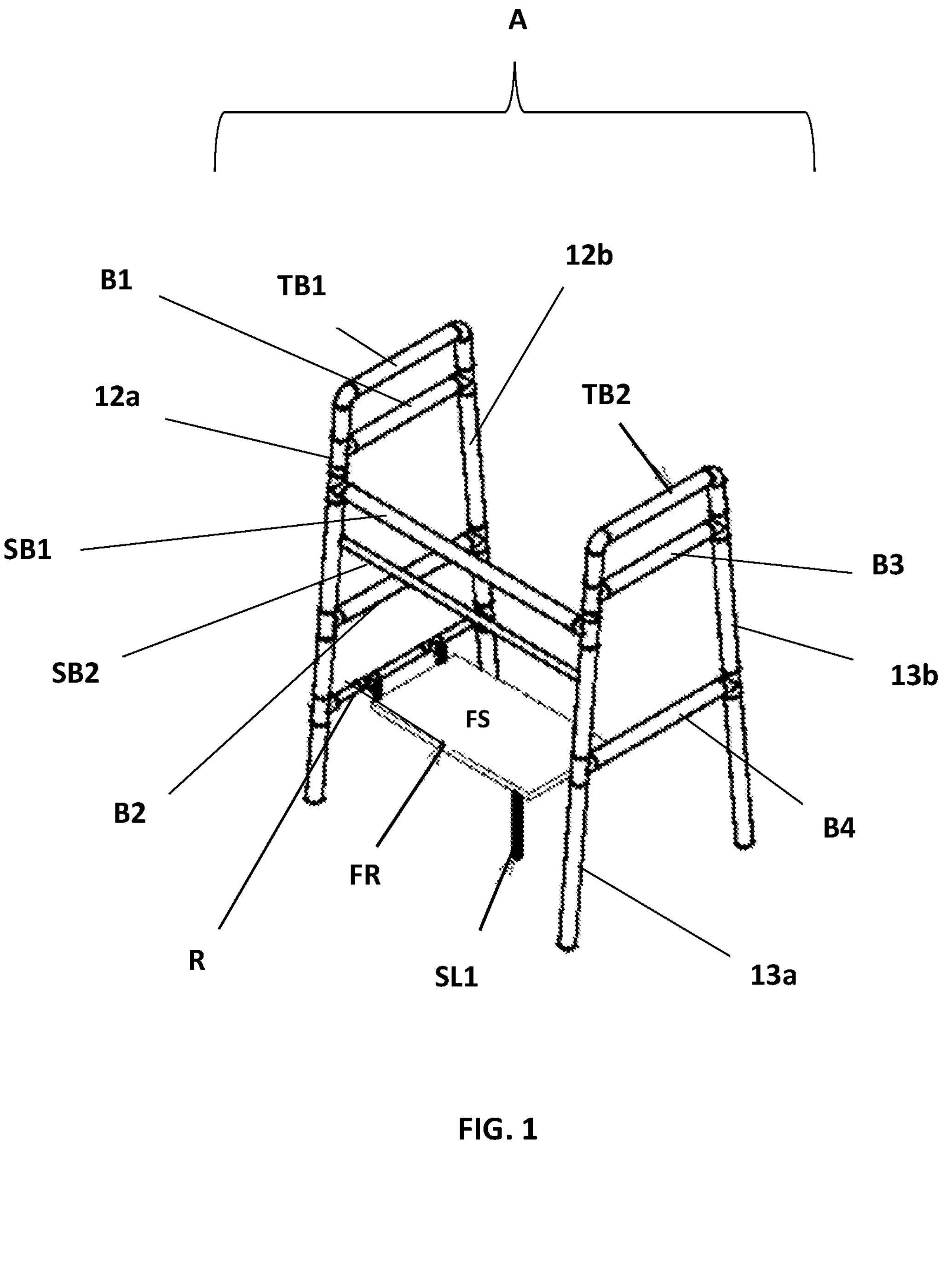
FIG. 1 is a perspective view of a walker step with the step in its lowered configuration.
Figure 2:
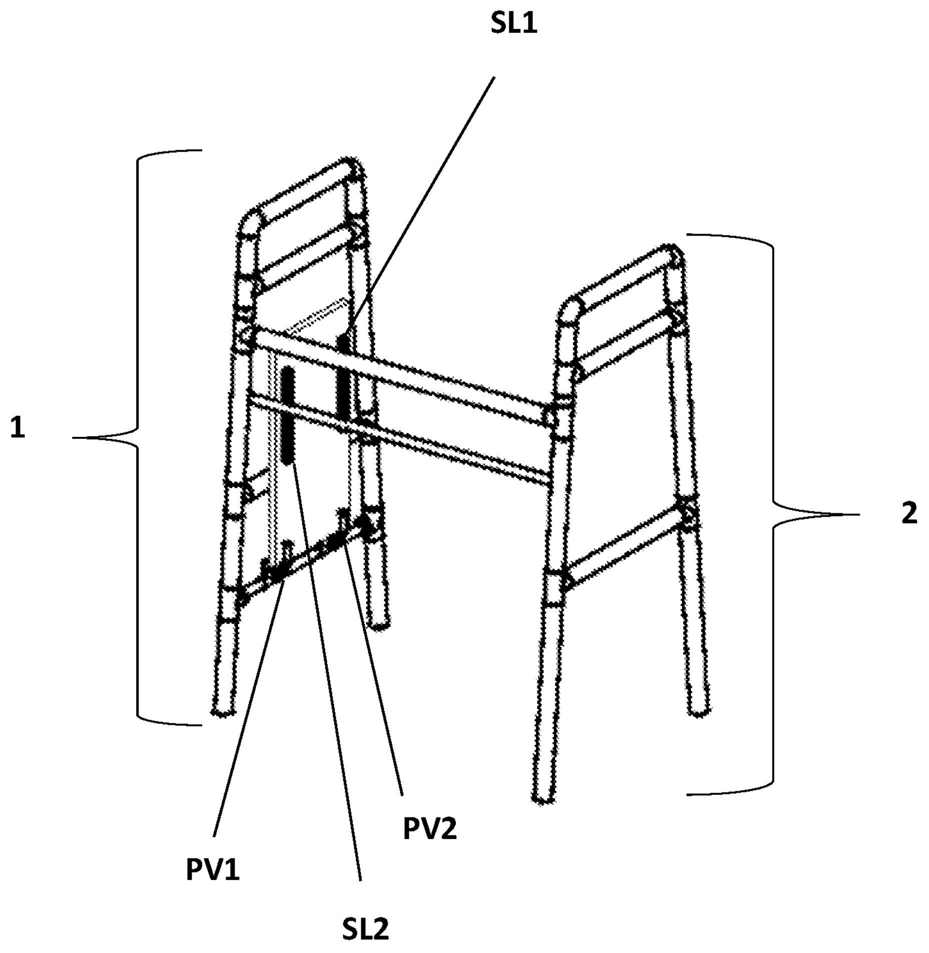
FIG. 2 is a perspective view of the walker step with the step in its raised configuration.

As shown in FIGS. 1 and 2, the foot rest FR comprises a flat surface FS having a top portion (i.e., the portion that receives the user's foot) and a bottom portion (i.e., the portion facing the floor); and one or more retractable foot rest support legs SL1, SL2 connected to or attached to the bottom portion of the flat surface FS via a hinge or similar structure. When the foot rest FR is lowered, the foot rest support legs SL1, SL2 are also lowered in response to gravity. Accordingly, when the foot rest FR is in a horizontal position or lowered configuration (i.e., with the bottom portion of the flat surface facing the floor), the support legs SL1, SL2 appear to be perpendicularly connected to the bottom of the flat surface FS. In other words, the one or more retractable foot rest support legs achieve a perpendicular position, with relation to the bottom portion of the flat surface, in response to gravity. Conversely, when the foot rest FR is in a vertical position or raised configuration (i.e., with the top portion of the flat surface facing the bars of the frame), the support legs SL1, SL2 appear to be parallel to the bottom portion of the foot rest FR. In other words, the one or more retractable foot rest support legs achieve a parallel position with relation to the bottom portion of the flat surface, in response to gravity. Alternatively, the foot rest support legs SL1, SL2 can be mechanically lowered or raised instead of relying on gravity. That is, with application of a force (such as pushing or pulling), the rest support legs SL1, SL2 can be lowered or raised.

Figure 3:
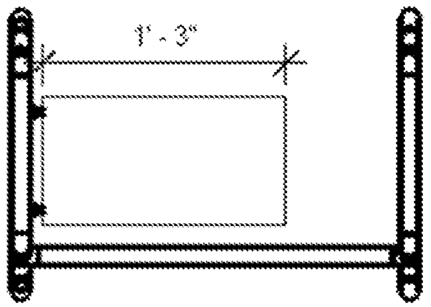
FIG. 3 is a top view of the walker step with the step in its lowered configuration.
Figure 4:
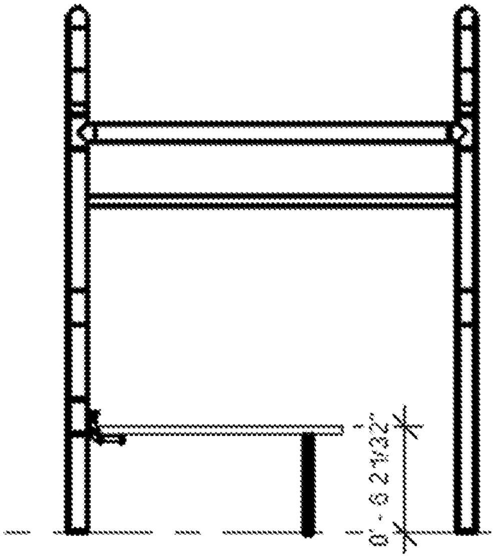
FIG. 4 is a front view of the walker step with the step in its lowered configuration.
Figure 5:
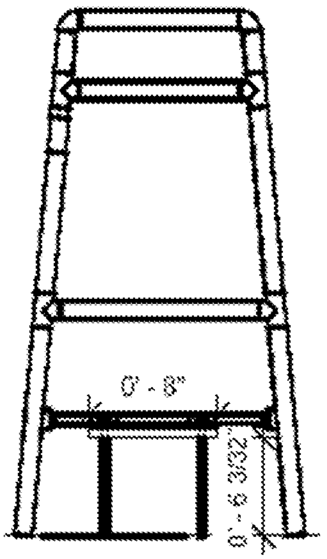
FIG. 5 is a side view of the walker step with the step in its lowered configuration.
Figure 6:
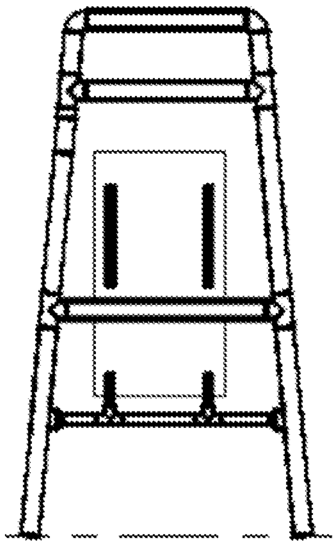
FIG. 6 is a side view of the walker step with the step in its raised configuration.
Figure 7:
FIG. 7 is a top view of the walker with the step in its raised configuration.
Figure 8:
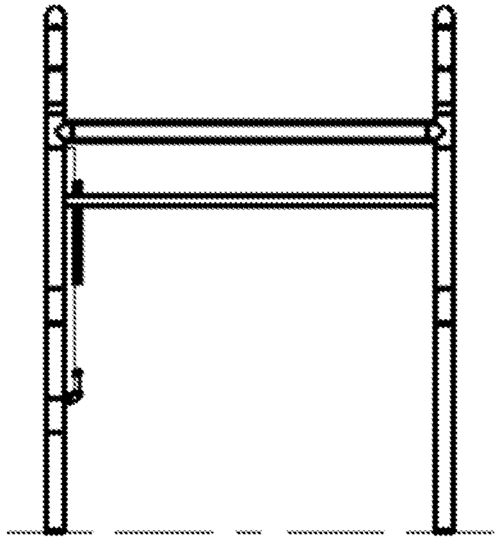
FIG. 8 is a front view of the walker step with the step in its raised configuration.

As shown in FIGS. 3, 4 and 5, certain elements of the of the foot rest FR have certain preferred measurements. For example, the length of the foot rest FR is preferably 1 feet and 3 inches, but other lengths are also possible. When the foot rest FR is in the lowered configuration, the difference in height between the foot rest FR and the floor is preferably $6\frac{3}{32}$ inches. On the other hand, the difference in height between the floor and the rod R is preferably $6\frac{21}{32}$ inches. Such difference in height facilitates reaching hard to reach places.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A walker, comprising:

a first frame;

a second frame;

wherein the first frame includes a first leg and a second leg;

wherein the second frame includes a first leg and a second leg;

one or more support bars connecting the first leg of the first frame to the first leg of the second frame;

a first top bar connecting an upper end of the first leg of the first frame with an upper end of the second leg of the first frame;

a second top bar connecting an upper end of the second leg of the second frame with an upper end of the second leg of the second frame;

a foldable foot rest having a flat surface;

wherein the foldable foot rest is pivotally connected to a single rod having a first end fastened to the first leg of the first frame and a second end fastened to the second leg of the first frame; and wherein the foldable foot rest comprises one or more retractable foot rest support legs at a bottom portion of the flat surface.

2. The walker of claim 1, wherein the foldable foot rest is pivotally connected to the rod via one or more pivot joints.

3. The walker of claim 1, further comprising one or more bars connecting each leg of the first frame.

4. The walker of claim 1, further comprising one or more bars connecting each leg of the second frame.

5. The walker of claim 1, wherein the first leg and second leg of the first frame, as well as the first leg and second leg of the second frame extend obliquely and away from the center of the corresponding top bar.

6. The walker of claim 1, wherein the foldable foot rest is configured to achieve a horizontal position as it is lowered.

7. The walker of claim 1, wherein the foldable foot rest is configured to achieve a vertical position as it is raised.

8. The walker of claim 1, wherein the one or more retractable foot rest support legs are configured to achieve a parallel position, with relation to a bottom portion of the flat surface, in response to gravity.

9. The walker of claim 1, wherein the one or more retractable foot rest support legs are configured to achieve a perpendicular position, with relation to a bottom portion of the flat surface, in response to a mechanical force.

10. The walker of claim 1, wherein the one or more retractable foot rest support legs are configured to achieve a parallel position, with relation to a bottom portion of the flat surface, in response to a mechanical force.

11. The walker of claim 1, wherein the one or more retractable foot rest support legs are configured to achieve a perpendicular position, with relation to a bottom portion of the flat surface, in response to gravity.

* * * * *